(12) United States Patent
Stoelinga

(10) Patent No.: US 7,997,290 B2
(45) Date of Patent: Aug. 16, 2011

(54) ASSEMBLY OF A SPINDLE AND GUIDE THEREFOR

(75) Inventor: Dirk Jan Stoelinga, Baarn (NL)

(73) Assignee: USP bvba, Kontich (BE)

( * ) Notice: Subject to any disclaimer, the term of this patent is extended or adjusted under 35 U.S.C. 154(b) by 0 days.

(21) Appl. No.: 12/522,112

(22) PCT Filed: Jan. 2, 2008

(86) PCT No.: PCT/NL2008/050001
§ 371 (c)(1),
(2), (4) Date: Oct. 5, 2009

(87) PCT Pub. No.: WO2008/082301
PCT Pub. Date: Jul. 10, 2008

(65) Prior Publication Data
US 2010/0012164 A1 Jan. 21, 2010

(30) Foreign Application Priority Data
Jan. 2, 2007 (NL) ...................................... 2000413

(51) Int. Cl.
*A45B 25/14* (2006.01)
*A45B 19/04* (2006.01)
(52) U.S. Cl. ......................... 135/20.3; 135/25.4; 135/98
(58) Field of Classification Search ................. 135/15.1, 135/16, 20.3, 905, 910, 25.1, 25.4, 98; 116/175; 362/102; 211/197
See application file for complete search history.

(56) References Cited

U.S. PATENT DOCUMENTS

| 2,714,005 | A | | 7/1955 | Wise | |
|---|---|---|---|---|---|
| 2,951,390 | A | | 9/1960 | Martens et al. | |
| 2,966,072 | A | | 12/1960 | Wise | |
| 3,129,715 | A | * | 4/1964 | Militano et al. | 135/20.3 |
| 3,311,119 | A | * | 3/1967 | Pearlstine | 135/20.3 |
| 4,424,824 | A | * | 1/1984 | Becher | 135/20.3 |
| 6,543,464 | B1 | * | 4/2003 | Grady, II | 135/22 |
| 6,953,043 | B2 | * | 10/2005 | Yu | 135/20.1 |
| 2006/0151019 | A1 | * | 7/2006 | Lo | 135/20.3 |
| 2009/0145469 | A1 | * | 6/2009 | Pirlo | 135/16 |
| 2010/0170545 | A1 | * | 7/2010 | Yang et al. | 135/20.3 |

FOREIGN PATENT DOCUMENTS

| DE | 4117150 A1 | * | 11/1992 |
|---|---|---|---|
| DE | 4302478 | | 8/1994 |
| JP | 08-103314 | | 4/1996 |
| JP | 08103314 A | * | 4/1996 |
| WO | WO 2006032162 A1 | * | 3/2006 |

* cited by examiner

*Primary Examiner* — Winnie Yip
(74) *Attorney, Agent, or Firm* — Sherr & Vaughn, PLLC

(57) ABSTRACT

The invention relates to a parasol provided with an actuator assembly comprising a spindle having a spindle longitudinal axis and an external screw thread, and a guide for the spindle comprising a holder which extends along a portion of the spindle and which is provided with at least a first and second set of bodies of revolution which are held in the holder body so as to be able to rotate about their axis of rotation and enter into contact with the spindle, where they engage with at least one screw thread part, the second set of bodies of revolution being set apart from the first set of bodies of revolution along the spindle longitudinal axis.

15 Claims, 4 Drawing Sheets

ASSEMBLY OF A SPINDLE AND GUIDE THEREFOR

CROSS REFERENCE TO PRIOR APPLICATIONS

The present application is a National Stage Application of PCT International Application No. PCT/NL2008/050001 (filed on Jan. 2, 2008), under 35 U.S.C. 371, which claims priority to The Netherlands Patent Application No. 2000413 (filed on Jan. 2, 2007), which is hereby incorporated by reference in its entirety.

BACKGROUND TO THE INVENTION

The invention relates to a parasol comprising stays which are hingeable at one end and operating arms which are hingeably coupled at one end to the stays.

JP-A-08 103314 describes an umbrella provided with a spindle and spindle nut. However, the design of the spindle and spindle nut has relatively high resistance, as a result of which opening and closing requires a relatively large amount of energy. If the selected design is used for a parasol, and in particular for large parasols which are nowadays popular, that problem will be exacerbated still further.

SUMMARY OF THE INVENTION

An object of the invention is to solve at least some of the problems outlined.

A further object of the invention is to provide a parasol which comprises an actuator assembly and is simple and inexpensive to make.

A further object of the invention is to provide an actuator assembly of this type which is simple to use for, for example, parasols. An additional or else alternative object of the invention is to provide a parasol having a design which is suitable for relatively large parasols having a cross section of, for example, more than four meters.

An additional or else alternative object of the invention is to provide a parasol having an actuator assembly which is suitable for automation, such as electric driving.

The invention provides for this purpose a parasol comprising stays which are hingeable at one end and operating arms which are hingeably coupled at one end to the stays, and an actuator assembly, operationally connected for mutually adjusting the hingeable end of the stays and the operating arms, the actuator assembly comprising a spindle having a spindle longitudinal axis and an external screw thread, and a guide for the spindle comprising a holder which extends along a portion of the spindle and which is provided with at least a first and second set of bodies of revolution which are held in the holder so as to be able to rotate about their axis of rotation and enter into contact with the spindle, where they engage with at least one screw thread part, the second set of bodies of revolution being set apart from the first set of bodies of revolution along the spindle longitudinal axis.

This parasol has a stable actuator which is simple to make from inexpensive, readily available components. In addition, it is simple to provide the actuator with a drive, such as an electric motor. Furthermore, as a result of the low resistance of the actuator, all that is required is therefore a relatively light electric motor which, if appropriate, can be driven even by means of photovoltaically generated electricity.

In fact, U.S. Pat. No. 5,809,837 describes a spindle provided with a guide consisting of a nut having an internal screw thread which corresponds in terms of the pitch and groove shape to the screw thread of the spindle and a large number of rollers between the external screw thread of the spindle and the internal screw thread of the nut. Each roller extends over a few times the pitch of the spindle. The nut has an elliptically varying inner diameter, so the rollers do not rest fully against the spindle at all times. As the screw thread of the spindle, the screw thread of the nut, and the shape and dimensions of the rollers have to be precisely adapted to one another and the nut additionally has a complex varying diameter, production is expensive, as U.S. Pat. No. 5,809,837 also acknowledges. In addition, as a result of the relatively large quantity of rollers and the fact that some of the rollers have to rest almost fully against the screw thread of the spindle, the friction is still relatively high.

In addition, WO-A-02/36969 describes a spindle comprising a guide wherein a housing extends along a portion of the length of the spindle. The housing contains a pair of rollers having a screw thread which corresponds to the screw thread of the spindle. Each roller extends along a portion of the length of the spindle.

An actuator assembly provided with a spindle having a spindle longitudinal axis and an external screw thread, and a guide for the spindle comprising a holder which extends along a portion of the spindle and which is provided with bodies of revolution which are held in the holder body so as to be able to rotate about their axis of rotation and enter into contact with the spindle, where they engage with at least one screw thread part, is generally also known from, inter alia, U.S. Pat. Nos. 2,966,072, 2,714,055, 2,951,390, 6,131,479 and WO-A 1-94/20773.

In U.S. Pat. Nos. 2,966,072, 2,951,390, 6,131,479 and WO-A1-94/20773, the bodies of revolution bear against a case or frame. The bodies of revolution as a result roll both against the spindle and against a case.

U.S. Pat. No. 2,714,005 does not relate to at least a first and second set of bodies of revolution, the second pair of bodies of revolution being set apart from the first pair of bodies of revolution along the spindle longitudinal axis.

A drawback of known guides of this type is that the friction is usually still relatively high. Furthermore, because the various components have to engage with one another, guides of this type are relatively expensive. Furthermore, the stability and support of the spindle is often less than ideal. Use of the actuator assemblies in a parasol is neither shown nor suggested.

The invention further provides for this purpose an actuator assembly comprising a spindle having a spindle longitudinal axis and an external screw thread, and a guide for the spindle comprising a holder which extends along a portion of the spindle and which is provided with at least a first and second set of bodies of revolution which are held in the holder body so as to be able to rotate about their axis of rotation and enter into contact with the spindle, where they engage with at least one screw thread part, the second pair of bodies of revolution being set apart from the first pair of bodies of revolution along the spindle longitudinal axis.

Providing the guide with the specific arrangement of bodies of revolution can provide a spindle which comprises a guide and can be activated in a simple manner and without large losses of friction and is also very stable. In particular, the choice of the positions of the bodies of revolution produces substantial sturdiness, although it has also been found to be possible to make the guide from simple and relatively inexpensive components.

In an embodiment, the first and second sets of bodies of revolution comprise at least three bodies of revolution.

In an embodiment, the bodies of revolution are rotatably fastened to shafts parallel to the spindle longitudinal axis.

In an embodiment, a body of revolution of the first and second set is held in the holder so as to be able to rotate on a common axis.

In an embodiment, the bodies of revolution of the first and second set are positioned on the spindle along the screw thread.

In an embodiment, the bodies of revolution are rollers, preferably bearing mounted rollers.

In an embodiment, the bodies of revolution act on one screw thread part.

In an embodiment, the holder comprises a first and second plate part with an opening for the passage of the spindle and provided with spacers for setting the plate parts apart from one another, the spacers preferably comprising a bush.

In an embodiment, the plate parts hold the shafts.

In an embodiment, the shafts are provided with two rollers with spacers therebetween.

In an embodiment, the assembly according to the invention further comprises a drive unit, preferably provided with at least one electric motor, for causing the spindle and the guide to rotate relative to each other with respect to the longitudinal axis of the spindle.

In an embodiment, the drive unit is coupled to an end of the spindle for causing the spindle to rotate about its longitudinal axis.

The invention further relates to an actuator assembly comprising a spindle having a spindle longitudinal axis and an external screw thread, and a guide for the spindle comprising a holder which extends along a portion of the spindle and which is provided with at least a set of at least six bodies of revolution which are held in the holder body so as to be able to rotate about their axis of rotation and enter into contact with the spindle, where they engage with at least one screw thread part, the bodies of revolution of the set being arranged around the spindle and set apart from one another along the spindle longitudinal axis for holding the spindle in such a way that it is able to rotate about its longitudinal axis. As a result, the spindle is stable with respect to forces which are at an angle relative to the longitudinal axis of the spindle. As will become apparent hereinafter, an actuator assembly of this type is, for example, particularly suitable as an actuator for the collapsing and extending of a parasol.

In particular, this is a parasol comprising an assembly as described hereinbefore, further provided with stays which are hingeable at one end and operating arms which are hingeably coupled at one end to the stays.

In an embodiment thereof, the spindle is coupled to the stays so as to be able to rotate about its longitudinal axis and the operating arms are hingeably coupled to the guide at their other end.

In an embodiment thereof, the guide is connected to a stem of the parasol.

In an embodiment thereof, the stem has a continuous cavity, through which the spindle can move up and down in the direction of its longitudinal axis, the stem being preferably a tube, in particular a round tube.

In an embodiment thereof, the operating arms are hingeably connected to the stem.

In an embodiment thereof, the pipe or bush is connected at one end to the holder and comprises at another end operating arms connected hingeably thereto.

In an embodiment thereof, the spindle is coupled at one end to a drive mechanism for rotating the spindle about its longitudinal axis, and the stays are hingeably coupled to the drive.

The invention further relates to a parasol comprising a stem having a longitudinal axis, stays, operating arms and an actuator for collapsing and extending the parasol, the operating arms being hingeably connected at one end to the stays, and the actuator comprises a spindle, a spindle guide and a drive unit, the actuator being coupled to the stem and configured for displacing the other end of the operating arms and ends of the stays relative to one another along the longitudinal axis of the stem.

In an embodiment of the parasol, the operating arms are hingeably connected at the other end to the stem.

In an embodiment of the parasol, the spindle guide is connected to the stem and the drive unit is coupled to the spindle in a driving manner so as to cause said spindle to rotate about its longitudinal axis.

In an embodiment of the parasol, the stays are hingeably coupled to the spindle at the aforementioned ends.

In an embodiment of the parasol, the end of the spindle is rotatably coupled at the aforementioned ends of the stays.

In an embodiment of the parasol, the stem is hollow and the spindle is displaceable within the stem along its longitudinal axis.

In an embodiment of the parasol, the spindle guide comprises a holder which extends along a portion of the spindle and which is provided with at least a set of at least six bodies of revolution which are held in the holder body so as to be able to rotate about their axis of rotation and enter into contact with the spindle, where they engage with at least one screw thread part, the bodies of revolution of the set being arranged around the spindle and set apart from one another along the spindle longitudinal axis for holding the spindle in such a way that it is able to rotate about its longitudinal axis.

In an embodiment of the parasol, the spindle guide comprises a holder which extends along a portion of the spindle and which is provided with a first and second set of in each case at least three bodies of revolution which are held in the holder body so as to be able to rotate about their axis of rotation and enter into contact with the spindle, where they engage with at least one screw thread part, the bodies of revolution of both sets being arranged around the spindle and the first and second set being set apart from each other along the spindle for holding the spindle in such a way that it is able to rotate about its longitudinal axis.

In an embodiment of the parasol, the drive unit is coupled to an end of the spindle in a driving manner.

In an embodiment of the parasol, the aforementioned ends of the stays are hingeably coupled to the drive unit.

Alternatively, the invention relates to an actuator assembly comprising a spindle having a spindle longitudinal axis and an external screw thread, and a guide for the spindle comprising a holder which extends along a portion of the spindle and which is provided with a series of bodies of revolution which are held in the holder body so as to be able to rotate about their axis of rotation and enter into contact with the spindle, where they engage with at least one screw thread part, the second pair of bodies of revolution being set apart from the first pair of bodies of revolution along the spindle longitudinal axis.

For effective stability of the spindle, preferably at least six bodies of revolution are arranged so as to enter into contact around the spindle. In addition, the number is preferably selected so as to be as small as possible in order to restrict the resistance as far as possible.

In an embodiment, in this case too the bodies of revolution enter into contact with the spindle in at least one depression in the screw thread.

The invention further relates to an actuator assembly comprising a spindle having a spindle longitudinal axis and an external screw thread, and a guide for the spindle comprising a holder which extends along a portion of the spindle and which is provided with at least a first and second set of bodies of revolution which are held in the holder so as to be able to rotate about their axis of rotation and enter into contact with the spindle, where they engage with at least one screw thread part, the second set of bodies of revolution being set apart from the first set of bodies of revolution along the spindle longitudinal axis. Various embodiments of an actuator assembly of this type have also been described hereinbefore.

The present patent application explicitly seeks protection for the various aspects concerning the actuator assembly and the parasol which are described in the present document. Protection is sought also for the various features mentioned inter alia in the sub-claims and the subsequent description of the figures. The features of the actuator assembly therefore also relate to the actuator assembly of the parasol.

BRIEF DESCRIPTION OF THE FIGURES

The invention will be described in greater detail with reference to certain illustrative embodiments which are represented in the appended figures, in which.

DETAILED DESCRIPTION OF AN EMBODIMENT

Figure 1:
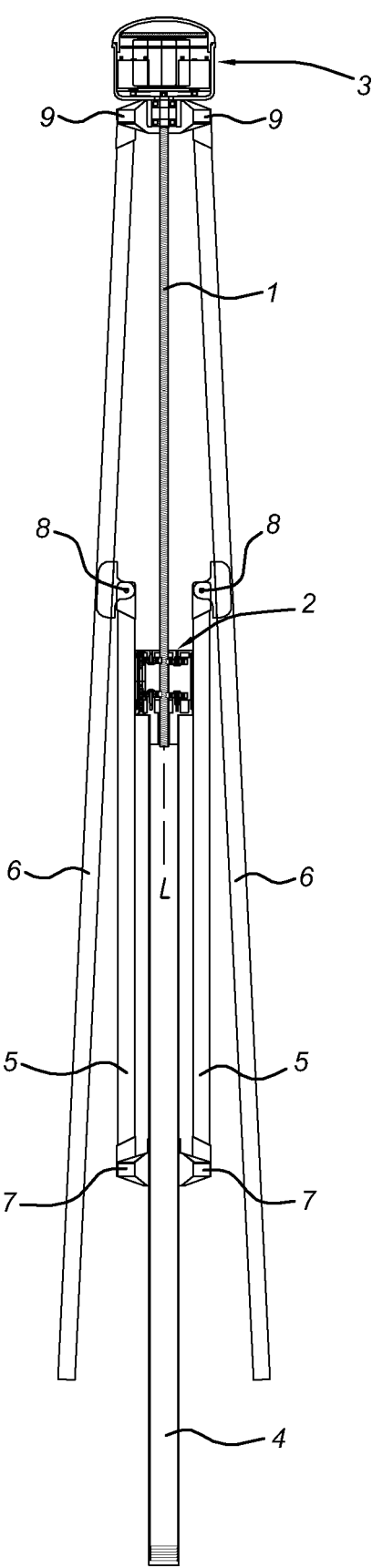
FIG. 1 shows an assembly according to the invention used in a parasol in the collapsed state.

FIG. 1 shows a parasol in the collapsed state comprising an assembly provided with a spindle 1 which has an external screw thread and is provided at one end with a housing 3 which is positioned rotatably thereon and provided with drive means for causing the spindle 1 to rotate about its longitudinal axis. At its other end, the spindle 1 is in this case provided with a guide 2. In this embodiment of an assembly according to the invention, the guide is used for the collapsing and extending of a parasol. For this purpose, the guide 2 is positioned on a stem 4. The stem 4 is in this case provided with a hinge which is secured thereto and has operating arms 5 which are fastened hingeably thereto and are fastened in turn, at their opposite end, to stays 6 by means of hinges 8. The stays 6 are in turn hingeably fastened to hinges 9 which are connected to the housing 3 containing, as stated hereinbefore, also the operating and drive mechanism for the spindle. As may be seen, in FIG. 1 the parasol is in its collapsed state. The stays may be provided with a fabric or plastics material cloth.

Figure 2:
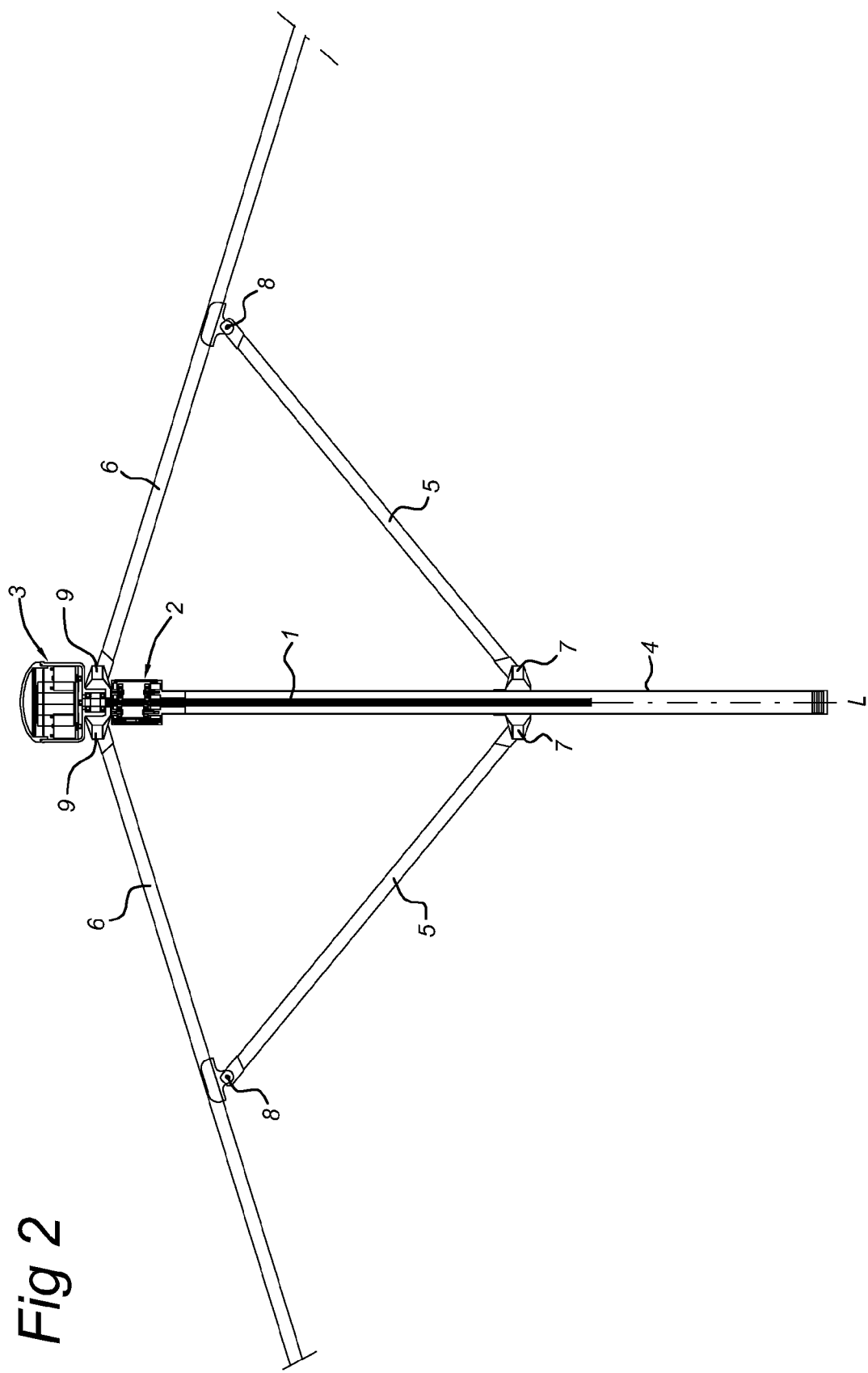
FIG. 2 shows the parasol from FIG. 1 in the open state.

FIG. 2 shows the parasol from FIG. 1 in its extended state. In the extended state of the parasol, the guide 2 for the spindle 1 has been moved almost entirely from the second end of the spindle to the end of the spindle that is located in the housing 3 comprising the drive unit.

Figure 3:
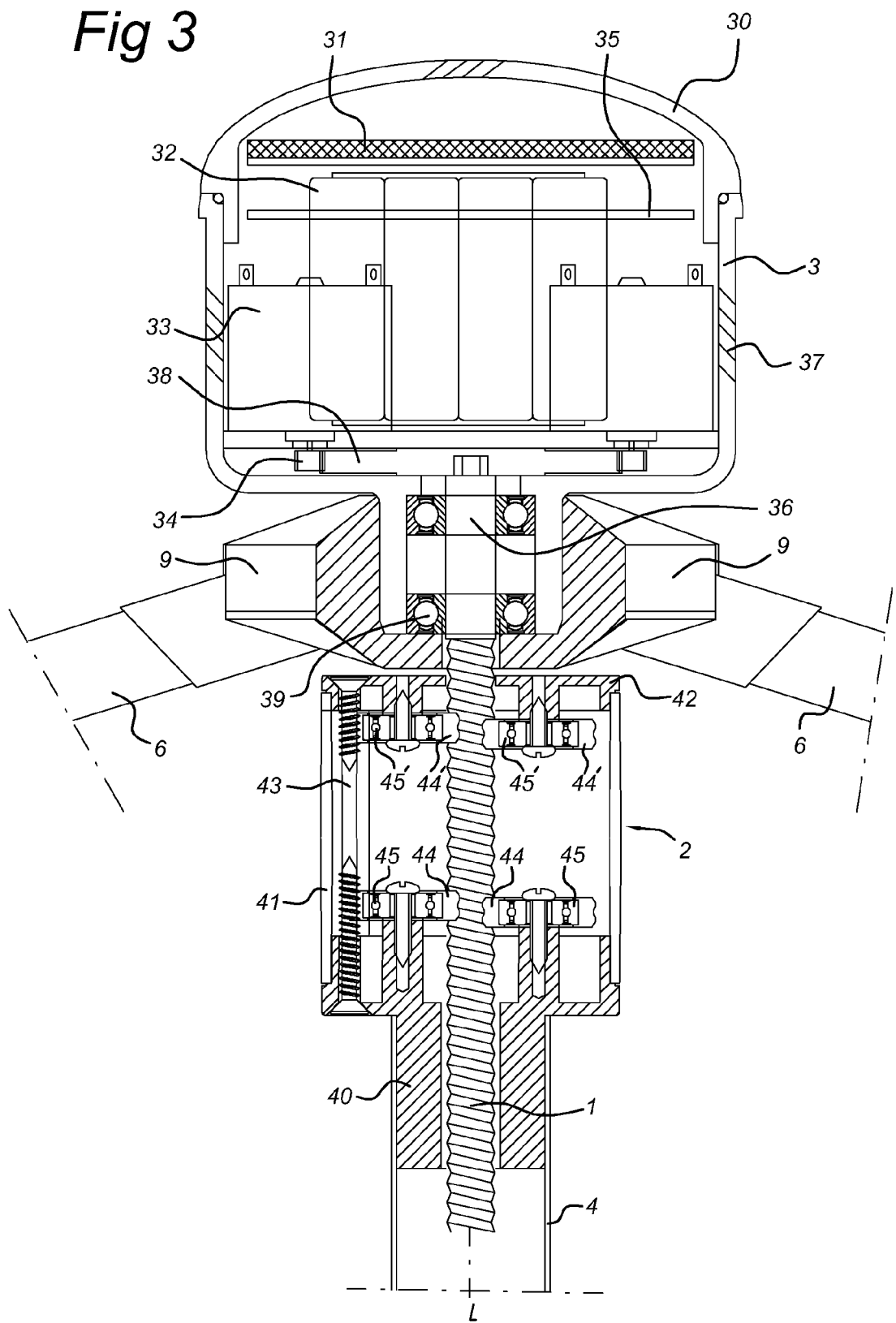
FIG. 3 is a longitudinal cross section of a detail of the assembly from FIGS. 1 and 2.

FIG. 3 is a detailed cross section of the housing 3 comprising the various electronic components for operating and moving the assembly according to the invention and also the guide 2 for the spindle. The housing 3 is in this case provided with a transparent cap 30 which allows (sun)light to pass. A solar panel 31 and batteries 32 are attached below the transparent cap 30. Control electronics, which are attached to a printed circuit board 35, are used to regulate the operation and energy management of the electric motors 33 which can cause the spindle 1 to rotate about its longitudinal axis 1 by means of a transmission 34 which acts on a gear-wheel 38 which is rigidly connected to one end of this spindle 1. The housing 3 is further provided with a bottom housing part 37. Mounted in the bottom part of the housing part 37 are in this case bearings 39 in which the end 36 of the spindle 1 is rotatably held. The hinges 9 are in this case fastened to the bottom housing part 37 of the housing 3.

The guide 2 comprises a bottom housing part 40 which is free from the spindle 1. This bottom housing part 40 is in this case inserted in a clamping manner into the upper part of the stem 4. A housing central part 41, which is in this case in the shape of a round tube and is provided on its upper side with a top housing part 42, is placed on the bottom housing part 40. The top housing part 42 is also provided with a passage for the spindle 1, through which the spindle is fed so as to be able to rotate freely. In the present embodiment, both the bottom housing part 40 and the top housing part 42 are provided with fastening parts to which rollers 44', which are mounted by means of bearings 45, are rotatably fastened. The rollers 44 are positioned to rest against the spindle 1. Therefore, the rollers 44 of the bottom housing part 40 and also the rollers 44' of the top housing part 42 are located in this case not in one plane.

The spindle 1 can have a rectangular or trapezoidal or ACME screw thread but also a different screw thread which is suitable for a spindle function. A screw thread of this type has a pitch, and the thread itself has peaks, depressions between the peaks, and a thread depth.

Figure 4:
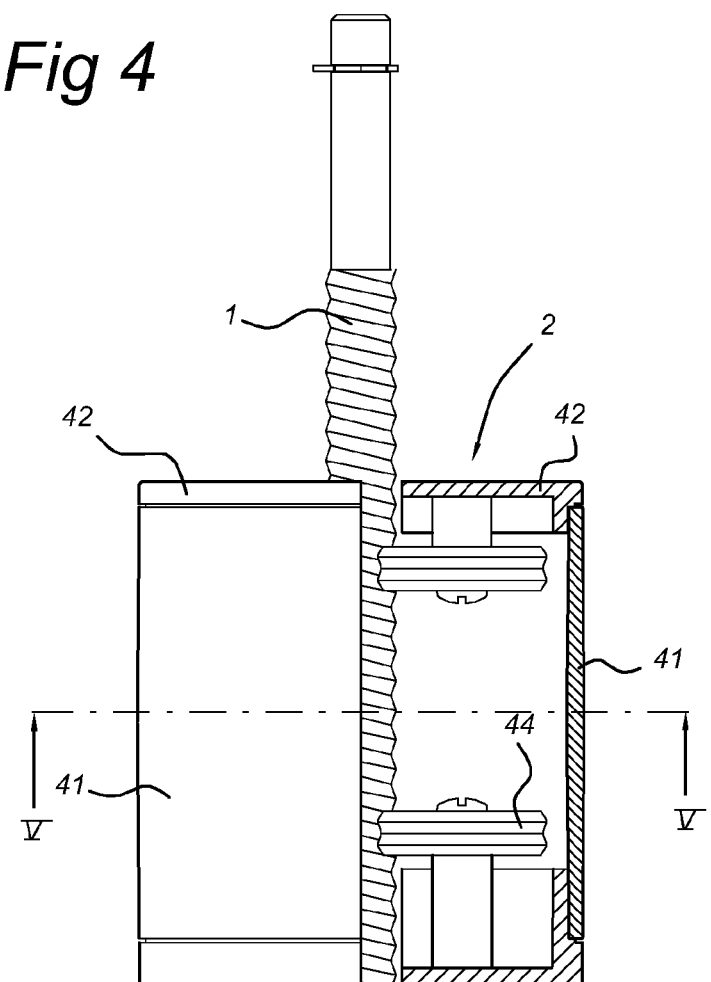
FIG. 4 is partially a longitudinal cross section of the guide of the assembly from FIG. 1.

FIG. 4 shows a guide for the spindle 1, partly in longitudinal cross section. Again, this clearly shows how the spindle runs freely through the bottom housing part 40 and the top housing part 42 and the rollers rest against the spindle 1. On the one hand, the two sets of rollers 44, 44', which are set apart from each other along the longitudinal axis of the spindle 1, allow the spindle 1 to be held in the guide 2 in such a way that said spindle is relatively free from play with respect to movements and rotations of the longitudinal axis; on the other hand, the small contact surfaces can, as a result of the fact that merely some of the rollers rest against the spindle 1, produce low friction, thus allowing the spindle 1 to rotate at low power about its longitudinal axis. As the spindle 1 rotates about its longitudinal axis, interaction of the screw thread and the guide will cause displacement of the guide 2 and the spindle 1 relative to each other along the longitudinal axis 1 of the spindle 1.

Figure 5:
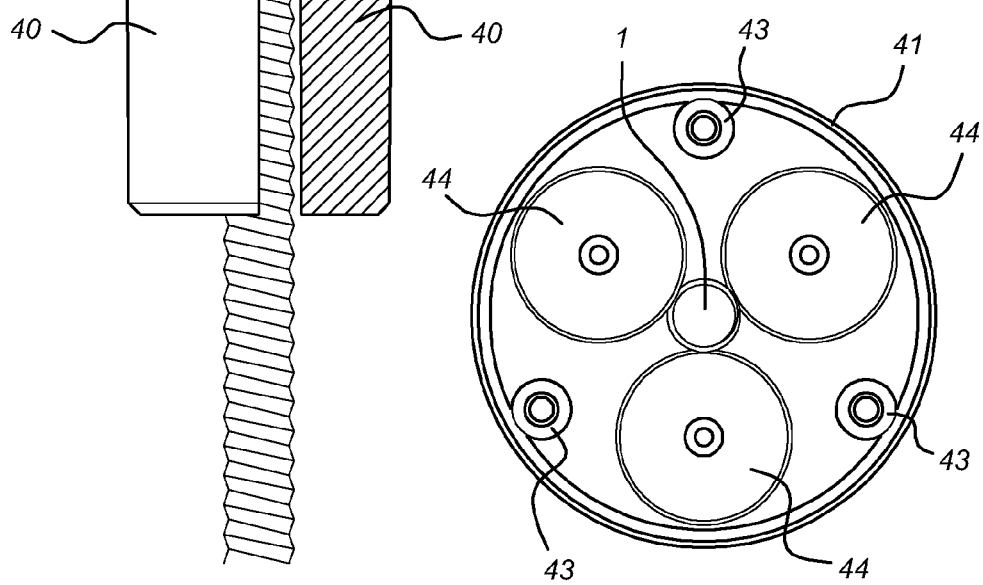
FIG. 5 is a cross section of the guide from FIG. 4.

FIG. 5 is a plan view of the guide 2 of the spindle 1. As a result of the use of three rollers 44, which are positioned around the spindle 1 in a triangular arrangement, preferably in an isosceles triangular arrangement, the spindle 1 is supported. By positioning a first set of three rollers 44 and a second series or set of rollers 44' along the longitudinal axis of the spindle set apart from the first set or group of rollers, it is possible, using six rollers, for the spindle 1 to be held in a certain manner between the rollers. Optionally, a larger number of rollers may be used, although with the minimum number of six the friction will be minimal, allowing the spindle 1 to be rotated about its longitudinal axis very simply and without the use of much drive power. This figure also shows fastening parts 43, the lower housing part 40 of the guide being connected in this case to the upper housing part 42.

The appropriate representation of the screw thread of the spindle 1 also clearly shows how the rollers 44 are in this case located not in one plane. The rollers are in this case each displaced relative to one another by ⅓ of the pitch of the spindle 1 along the direction of the longitudinal axis of the spindle 1.

The circumference of each roller enters into contact with the circumference of the spindle 1. The rollers extend in this case along the longitudinal direction of the spindle, entering into contact with the spindle at least in one depression in the screw thread. In the embodiment of FIG. 4, the rollers enter into contact with the spindle between two depressions. On rotation about its longitudinal axis, the spindle exerts a force on the rollers by means of the flanks of its screw thread. The rollers 44 will experience a force from the downwardly oriented flank (in the figure) on rotation of the spindle 1 toward the right and from the upwardly oriented flank on rotation toward the left.

It will be clear that the assembly illustrated in the present document is intended for a parasol. By activating the electric motors 33, the rotation of the electric motors will be transmitted by means of the gear-wheels 34 to the spindle 1 via the gear-wheel 38. The spindle 1, which is also held in the housing 3 by means of the bearings so as to be able to rotate, will be made to rotate about its longitudinal axis 1. As a result of the fact that the guide 2 is able to move freely along the spindle 1, the rotation of the spindle 1 about its longitudinal axis will enable the guide to move along the longitudinal axis of the spindle 1. This allows the rotational movement of electric motors 3 to be converted into a rectilinear movement of the guide 2. In the use for the parasol, as represented in the present exemplary embodiment, a parasol can easily be unfolded and folded up electronically. As a result, a user can, for example, be provided with a remote control and the electronics can be provided with transmitting and receiving means, allowing the parasol to be collapsed and extended remotely.

The drive or the assembly according to the invention can be used not only for unfolding and folding up a parasol but also for driving other items of everyday use. Examples include sunscreens, items of furniture, garage doors or other objects, requiring conversion of a rotational movement of, for example, an electric motor into a rectilinear displacement or movement.

It will be clear that further variations of the above-described embodiments are conceivable and will be obvious to a person skilled in the art from the present description. Embodiments of this type fall under the scope of protection of the following claims.

It will be clear that features set out in the sub-claims can also be used independently of the features described in the main claim. In that case, protection is also explicitly sought for the features of the sub-claims.

The invention claimed is:

1. A parasol comprising:
a stem;
stays;
operating arms which are hingeably coupled at a first end thereof to the stays;
an actuator assembly operationally connected for mutually adjusting the end of the stays and the operating arms, the actuator assembly including a spindle having a spindle longitudinal axis and an external screw thread, wherein the stays are hingeably movable relative to the actuator assembly; and
a spindle guide connected to the stem, the spindle guide including a holder which extends along a portion of the spindle and which is provided with at least a first set of bodies of revolution and a second set of bodies of revolution which are held in the holder so as to rotate about an axis of rotation and enter into contact with the spindle,
wherein the first set of bodies of revolution and the second set of bodies of revolution each engage with at least one screw thread part and the second set of bodies of revolution is set apart from the first set of bodies of revolution along the spindle longitudinal axis.

2. The parasol of claim 1, wherein the spindle is coupled to the stays so as to rotate about its longitudinal axis and wherein the operating arms at a second end thereof are hingeably coupled to the spindle guide.

3. The parasol of claim 1, wherein the operating arms are hingeably connected to the stem.

4. The parasol of claim 1, wherein the stem comprises a cylindrical pipe having a continuous cavity through which the spindle can move up and down in the direction of its longitudinal axis.

5. The parasol of claim 4, wherein the operating arms are hingeably connected to the stem.

6. The parasol of claim 1, wherein the spindle is coupled at one end thereof to a drive mechanism for rotating the spindle about its longitudinal axis, and wherein the stays are hingeably coupled at the drive.

7. A parasol comprising a stem having a longitudinal axis, stays, operating arms and an actuator for collapsing and extending the parasol, the operating arms being hingeably connected at one end to the stays, the actuator comprising a spindle, a spindle guide and a drive unit, the actuator being coupled to the stem and configured for displacing the other end of the operating arms and ends of the stays relative to one another along the longitudinal axis of the stem, wherein the spindle guide comprises a holder which extends along a portion of the spindle and which is provided with at least a set of at least six bodies of revolution which are held in the holder body so as to rotate about their axis of rotation and enter into contact with the spindle, wherein the bodies of revolution engage with at least one screw thread part, the bodies of revolution being arranged around the spindle and set apart from one another along the spindle longitudinal axis for holding the spindle in such a way that the spindle rotates about its longitudinal axis.

8. The parasol of claim 7, wherein the operating arms are hingeably connected at the other end to the stem.

9. The parasol of claim 7, wherein the spindle guide is connected to the stem, the drive unit is coupled to the spindle in a driving manner so as to cause the spindle to rotate about its longitudinal axis.

10. The parasol of claim 7, wherein the stays are hingeably coupled to the spindle at ends thereof.

11. The parasol of claim 7, wherein the end of the spindle is rotatably coupled at the ends of the stays.

12. The parasol of claim 7, wherein the stem comprises a hollow spindle body and the spindle is displaceable within the stem along its longitudinal axis.

13. A parasol comprising:
a stem having a longitudinal axis;
stays;
operating arms hingeably connected at a first end thereof to the stays; and
an actuator for collapsing and extending the parasol, the actuator comprising a spindle, a spindle guide and a drive unit, wherein the actuator is coupled to the stem and configured for displacing a second end of the operating arms and ends of the stays relative to one another along the longitudinal axis of the stem,
wherein the spindle guide comprises a holder which extends along a portion of the spindle and which is provided with a plurality of first bodies of revolution and a plurality of second set of at least three bodies of revolution which are held in the holder body so as to rotate about their axis of rotation and enter into contact with the spindle, wherein the first set of bodies of revolution and the second set of bodies of revolution engage with at least one screw thread part, the first set of bodies of revolution and the second set of bodies of revolution being arranged around the spindle and set apart from each other along the spindle for holding the spindle in such a way that the spindle rotates about its longitudinal axis.

14. The parasol of claim 13, wherein the first set of bodies of revolution and the second set of bodies of revolution each comprise at least three bodies of revolution.

15. The parasol of claim 13, wherein the drive unit is coupled to an end of the spindle in a driving manner.

\* \* \* \* \*